Aug. 25, 1959 J. F. KLINKHAMER ET AL 2,901,555

ELECTROMECHANICAL AMPLIFIER

Filed June 30, 1953

INVENTORS
JACOB FREDERIK KLINKHAMER
CORNELIS MARTINUS VAN DER BURGT
JOHANNES MEYER CLUWEN

BY [signature]

AGENT

United States Patent Office 2,901,555

Patented Aug. 25, 1959

2,901,555

ELECTROMECHANICAL AMPLIFIER

Jacob Fredrik Klinkhamer, Cornelis Martinus van der Burgt, and Johannes Meyer Cluwen, Eindhoven, Netherlands, assignors, by mesne assignments, to North American Philips Company, Inc., New York, N.Y., a corporation of Delaware Application June 30, 1953, Serial No. 365,104

Claims priority, application Netherlands June 30, 1952

6 Claims. (Cl. 179—171)

The invention relates to electromechanical filters, more particularly to electromechanical filters for oscillations at a frequency corresponding with a mechanical resonance frequency of a vibrator body. Such filters are used for example for absorbing a given frequency band; in this case they have the advantage inter alia that generally their selectivity exceeds considerably that of a filter which is simply made up of resistors, inductances and capacitors.

The invention is based on the recognition of the fact that generally the vibrator body consists, at least partly, of polarisable electrostrictive or magnetostrictive material which enables it to be used at the same time as a dielectric or magnetic amplifier respectively.

According to the invention the vibrator body consists, at least in part, of polarisable material, to which a signal oscillation is supplied and which is also driven by an auxiliary oscillation at a frequency exceeding the signal frequency into a non-linear part of its polarisation characteristic curve, with the result that an amplified output oscillation is produced in a manner known per se.

The invention will now be described with reference to a diagrammatic drawing, given by way of example, in which—

Figure 1:
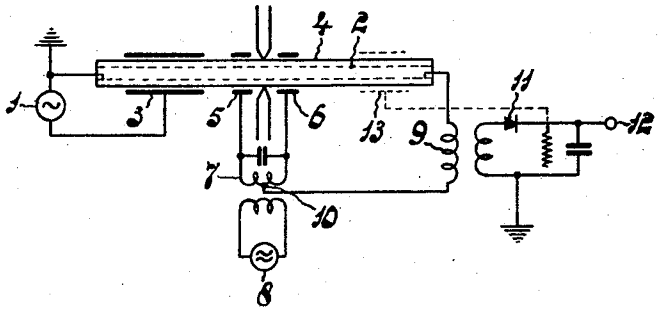
Figure 2:
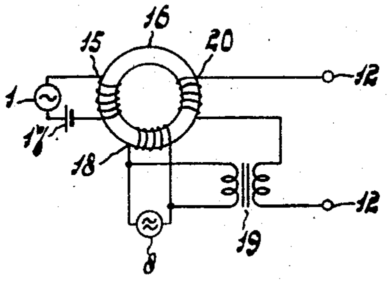
Figure 3:
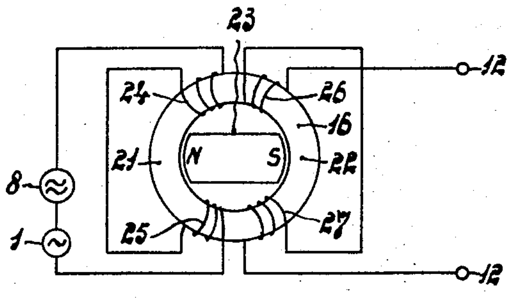

Fig. 1 shows an embodiment of a filter according to the invention, comprising a tubular vibrator body made of dielectric material, and Fig. 2 shows an embodiment of a filter according to the invention comprising an annular vibrator body made of magnetic material, and Fig. 3 shows a modification of a filter of the kind shown in Fig. 2.

In the embodiment shown in Fig. 1 an electric signal oscillation provided by a source 1 is supplied to an inner electrode 2 and an outer electrode 3 of an elongated tubular vibrator body 4 made of dielectric, electrostrictive material, for example pre-polarised barium titanate, a mechanical resonance frequency of which, which may be reduced by means of weights, corresponds with the signal frequency. The signal oscillations are thus set up across electrodes 5 and 6 of the vibrator body 4 at a frequency selected in accordance with this mechanical resonant frequency.

According to the invention, connecting at the same time the vibrator body in a manner known per se as a dielectric amplifier permits of abstracting an amplified output oscillation from this body. For this purpose the electrodes 5 and 6 have supplied to them through a secondary coil 7 an auxiliary oscillation supplied from a source 8, the frequency of which considerably exceeds the signal frequency and the amplitude of which is such that the dielectric material of the body 4 is driven into the non-linear part of the polarisation characteristic curve which shows the dielectric displacement D as a function of the electric field strength F. Thus, set up across an impedance 9 which is connected between the electrode 2 and an asymmetric tapping 10 on the inductance 7 is an amplified modulated oscillation which, if desired, may be detected by means of a detector 11, with the result that an output terminal 12 has set up across it an amplified and filtered signal oscillation which, if desired, may be returned to the electrode 3 or to a further prepolarised electrode 13 (represented by broken lines) on the vibrator body 4 in order to provide positive or negative feedback. Although due to the required large amplitudes of the auxiliary oscillation the selectivity is slightly affected, it frequently remains even higher than is obtainable by the use of a simple LCR-network. Also the mechanical resonance frequency of the body 4 is slightly shifted by the auxiliary frequency.

Instead of employing a vibrator body of the tubular shape shown, resort may be had, if desired, to an elongated rod-shaped body.

In Fig. 2 signal oscillations are supplied from a source 1 to a winding 15 which is arranged so as to surround freely an annular vibrator body 16 made of magnetostrictive material prepolarised by a source 17, for example substantially non-conductive ferrite having a high permeability. In addition, a winding 18 on the body 16 has supplied to it from an auxiliary oscillation source 8 an oscillation the frequency of which considerably exceeds the signal frequency and the amplitude of which is such that the material of the body 16 is driven into a non-linear part of its polarisation characteristic curve which is represented by plotting the magnetic flux density B as a function of the magnetic field strength H. This causes the body 16 in a manner known per se to act as a magnetic amplifier.

The body 16 is arranged so as to be able to carry out slightly damped mechanical oscillations, the mechanical resonance frequency being such that its value corresponds with a mixed frequency of the signal and auxiliary frequencies, for example the sum or the difference of these frequencies. Thus, the mixed oscillation at this frequency set up across an output winding 20 will be amplified selectively, the remaining frequencies of the resultant being strongly rejected.

However, this rejection is generally insufficient for the auxiliary frequency, since the signal oscillation normally has a small amplitude as compared with the auxiliary oscillation. In order to reject the auxiliary oscillation across the output terminals 12 the auxiliary oscillation source 8 has coupled to it a balancing transformer 19, which is proportioned such that its secondary voltage is substantially equal and opposite to the auxiliary frequency voltage set up across a winding 20. The difference of these two voltages set up across the output terminals 12 thus contains substantially only the desired amplified mixed oscillation.

Fig. 3 shows a modification of the filter shown in Fig. 2, in which the polarisation of the vibrator body 16 is ensured by means of a permanent magnet 23 (shown diagrammatically) which is preferably of the substantially non-conductive kind, such as Ferroxdure, and which is arranged between two diametrically opposite points 21 and 22. The signal oscillation of the source 1 and the auxiliary oscillation of the source 8 are supplied to the series-aiding combination of windings 24 and 25 arranged on either side of a diameter 21—22, so that the corresponding magnetic fields are additive and hence a sufficiently strong auxiliary frequency field can be produced even by means of few turns. The body 16 again shows a mechanical resonance for a mixed frequency, for example the sum or difference frequency of the signal and auxiliary frequencies, so that this mixed frequency is strongly favoured above the remaining frequencies, the phases of the mixed oscillation in the body 16 on either side of the diameter 21—22 being opposite, since the polarising field of the permanent magnet 23 is of opposite direction in these parts of the body 16, so that by series opposition connection of two suitably proportioned output windings 26 and 27 arranged on these parts an amplified mixed oscillation is set up across the output terminals 12, the auxiliary oscillation being precisely compensated for.

What is claimed is:

1. An electromechanical filter device comprising a vibrator body composed at least in part of polarizable material and having a mechanical resonance frequency and a polarization characteristic curve having a non-linear part, a source of signal oscillations, means connected to apply said signal oscillations to said vibrator body, a source of auxiliary oscillations having a frequency exceeding the frequency of said signal oscillations, and means connected to apply said auxiliary oscillations to said vibrator body with a magnitude to cause said body to be operated in said non-linear part of its polarization characteristic curve thereby to produce amplification of said signal and auxiliary oscillations, said mechanical resonance frequency being equal to the frequency of said signal only oscillations or a mixed frequency component of both of said signal and auxiliary oscillations so that said vibrator body filters out the frequency of said auxiliary oscillations, whereby said vibrator body produces an amplified output oscillation which depends on said signal oscillations and said auxiliary oscillations.

2. The device in accordance with claim 1, in which said vibrator body comprises a dielectric material having an elongated shape, and in which said mechanical resonance frequency is equal to the frequency of said signal oscillations.

3. The device in accordance with claim 2, including a detector for said output oscillation, means for feeding said output oscillation to said detector, means for applying a further signal to said vibrator body, and means interconnecting said detector and said further signal applying means in feedback relationship thereby to vibrate said vibrator body in accordance with the detected output oscillation.

4. An electromechanical filter device comprising a source of signal oscillations, a source of auxiliary oscillations having a frequency exceeding the frequency of said signal oscillations, an annular vibrator body made of magnetostrictive material and having a mechanical resonance frequency corresponding with a mixed frequency of said signal and auxiliary oscillations and having a polarization characteristic curve having a non-linear part, means for vibrating said vibrator body in accordance with said signal oscillations, and means for vibrating said vibrator body in accordance with said auxiliary oscillations into said non-linear part of its polarization characteristic curve whereby said vibrator body produces an amplified output oscillation of a mixed frequency of said signal and auxiliary oscillation.

5. The device in accordance with claim 4, in which said output oscillation has an undesired auxiliary oscillation component, and including an output circuit, means for feeding said output oscillation to said output circuit, and means connected between said source of auxiliary oscillations and said output circuit for feeding at least a portion of said auxiliary oscillations to said output circuit to compensate for said undesired auxiliary oscillation component.

6. The device in accordance with claim 4, including a magnet positioned to produce a polarizing field between diametrically opposite points of said annular vibrator body and in which said means for vibrating said vibrator body in accordance with said auxiliary oscillations comprises two windings positioned around said vibrator body respectively on opposite sides of said diameter and connected electrically in series-aiding combination to said source of auxiliary oscillations, and including two output windings positioned around said vibrator body respectively on opposite sides of said diameter and connected electrically in series opposition.

References Cited in the file of this patent

UNITED STATES PATENTS

| | | |
|---|---|---|
| 2,265,296 | Lee | Dec. 9, 1941 |
| 2,470,893 | Hepp | May 24, 1949 |
| 2,476,804 | Boykin | July 19, 1949 |
| 2,683,856 | Kornei | July 13, 1954 |
| 2,696,530 | Kerns | Dec. 7, 1954 |
| 2,738,386 | Roberts | Mar. 13, 1956 |

UNITED STATES PATENT OFFICE

CERTIFICATE OF CORRECTION

Patent No. 2,901,555 August 25, 1959

Jacob Fredrik Klinkhamer et al.

It is hereby certified that error appears in the printed specification of the above numbered patent requiring correction and that the said Letters Patent should read as corrected below.

Column 3, line 20, after "equal" insert -- only --; line 21, strike out "only"; column 4, line 12, for "oscillation" read -- oscillations --.

Signed and sealed this 1st day of March 1960.

(SEAL)
Attest:

KARL H. AXLINE
Attesting Officer

ROBERT C. WATSON
Commissioner of Patents